United States Patent
Koker et al.

(10) Patent No.: US 9,626,735 B2
(45) Date of Patent: Apr. 18, 2017

(54) PAGE MANAGEMENT APPROACH TO FULLY UTILIZE HARDWARE CACHES FOR TILED RENDERING

(71) Applicant: Intel Corporation, Santa Clara, CA (US)

(72) Inventors: Altug Koker, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 16 days.

(21) Appl. No.: 14/124,845

(22) PCT Filed: Jun. 24, 2013

(86) PCT No.: PCT/US2013/047234
§ 371 (c)(1),
(2) Date: Dec. 9, 2013

(87) PCT Pub. No.: WO2014/209252
PCT Pub. Date: Dec. 31, 2014

(65) Prior Publication Data
US 2014/0375661 A1    Dec. 25, 2014

(51) Int. Cl.
| | |
|---|---|
| *G06T 1/60* | (2006.01) |
| *G09G 5/393* | (2006.01) |
| *G06F 12/0802* | (2016.01) |
| *G09G 5/36* | (2006.01) |

(52) U.S. Cl.
CPC ............ *G06T 1/60* (2013.01); *G06F 12/0802* (2013.01); *G09G 5/363* (2013.01); *G09G 5/393* (2013.01); *G06F 2212/455* (2013.01); *G09G 2360/121* (2013.01); *G09G 2360/122* (2013.01)

(58) Field of Classification Search
None
See application file for complete search history.

(56) References Cited

U.S. PATENT DOCUMENTS

| | | | |
|---|---|---|---|
| 6,674,443 B1 * | 1/2004 | Chowdhuri et al. | 345/557 |
| 6,856,320 B1 | 2/2005 | Rubinstein et al. | |
| 7,616,209 B1 * | 11/2009 | Molnar et al. | 345/545 |
| 7,768,520 B2 * | 8/2010 | Deb | 345/530 |
| 8,405,668 B2 * | 3/2013 | Bratt et al. | 345/568 |

(Continued)

FOREIGN PATENT DOCUMENTS

| | | |
|---|---|---|
| EP | 3014456 A1 | 5/2016 |
| KR | 10-2013-0052659 A | 5/2013 |
| WO | 2014209252 A1 | 12/2014 |

OTHER PUBLICATIONS

International Search Report and Written Opinion received for PCT Patent Application No. PCT/US2013/047234, mailed on Mar. 14, 2014, 10 pages.

(Continued)

*Primary Examiner* — Jacinta M Crawford
(74) *Attorney, Agent, or Firm* — Jordan IP Law, LLC (57) ABSTRACT

Systems and methods may provide for identifying a tile associated with an image and ordering an entirety of the tile into a linear stream of pages associated with a frame buffer. Additionally, the linear stream of pages may be allocated to a cache. In one example, the linear stream of pages is allocated to the cache in accordance with a fixed set selection policy of the cache.

24 Claims, 5 Drawing Sheets

(56) References Cited

U.S. PATENT DOCUMENTS

| | | |
|---|---|---|
| 2005/0237329 A1 | 10/2005 | Rubinstein et al. |
| 2006/0044603 A1 | 3/2006 | Meeker et al. |
| 2009/0113169 A1 | 4/2009 | Yang et al. |
| 2009/0244074 A1 | 10/2009 | Montrym et al. |
| 2011/0080419 A1 | 4/2011 | Croxford et al. |
| 2012/0050303 A1 | 3/2012 | McAllister et al. |
| 2013/0036290 A1 | 2/2013 | Nystad |
| 2013/0328889 A1* | 12/2013 | Chen .................. G06T 1/60 345/501 |
| 2014/0118379 A1* | 5/2014 | Hakura et al. ............... 345/557 |

OTHER PUBLICATIONS

International Preliminary Report on Patentability received for PCT Patent Application No. PCT/US2013/047234, mailed on Jan. 7, 2016, 7 pages.

European Search Report for European Patent Application No. 13888103.2, dated Dec. 15, 2016, 11 pages.

* cited by examiner

PAGE MANAGEMENT APPROACH TO FULLY UTILIZE HARDWARE CACHES FOR TILED RENDERING

BACKGROUND

Displaying visual content may involve the use of a frame buffer to store image data prior to transferring the image data to a display device. Each image may be rendered as a set of tiles, wherein as a given tile is being rendered, a cache may be used to store the tile during processing of the tile by a tile renderer. Such an approach may be particularly advantageous on handheld and other small form factor devices with limited cache space. Of particular note, however, is that conventional caching solutions may allocate pages of the frame buffer to the cache in a manner that prevents the cache from being fully utilized. Insufficient utilization of the cache may have a negative impact on performance and/or power consumption.

If the cache is used for different types of data, changing the caching policy (e.g., set selection policy) to more effectively support tiles may present challenges with respect to other types of non-tiled data such as texture data and/or render target data. Moreover, tuning the caching policy to be data type dependent may be complex and ineffective for general usage models. Additionally, randomizing frame buffer page assignments in a given tile to create a more random distribution in the cache may still fail to guarantee full utilization of the cache. Simply put, while conventional tiled rendering solutions may be advantageous under certain circumstances, there remains considerable room for improvement with regard to cache utilization.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
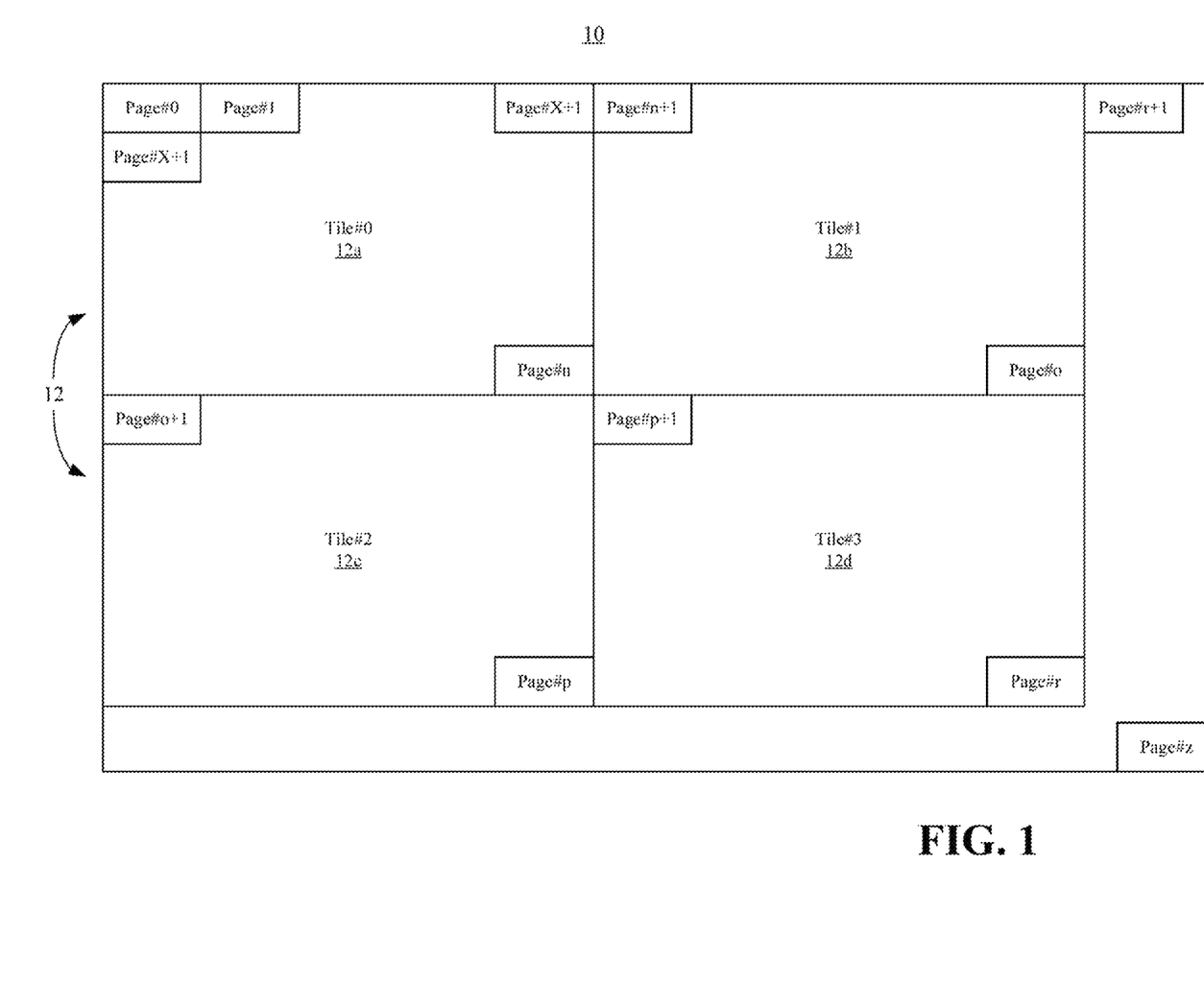
FIG. 1 is a block diagram of an example of a frame buffer according to an embodiment.

Turning now to FIG. 1, a frame buffer 10 is shown, wherein the frame buffer 10 may generally be used to store image data in conjunction with the display of the image data via a display device. The frame buffer 10 may be organized into addressable pages of memory. In the illustrated example, the frame buffer 10 contains a plurality of tiles 12 (12a-12d). Each tile 12 may include a plurality of color values for the image to be displayed on a pixel-by-pixel basis (e.g., each pixel in the image has a color value).

Additionally, the entirety of each tile 12 may be ordered into a linear stream of pages. For example, a first tile 12a ("Tile#0") may be ordered into a linear stream of pages beginning with "Page#0" and ending with "Page#n", a second tile 12b ("Tile#1") may be ordered into a linear stream of pages beginning with "Page#n+1" and ending with "Page#o", a third tile 12c ("Tile#2") may be ordered into a linear stream of pages beginning with "Page#o+1" and ending with "Page#p", a fourth tile 12d ("Tile#3") may be ordered into a linear stream of pages beginning with "Page#p+1" and ending with "Page#r", and so forth. As will be discussed in greater detail, ordering the entirety of each tile 12 into a linear stream of pages may enable the pages to be allocated to a cache in accordance with a fixed caching policy (e.g., fixed set selection policy), while achieving full utilization of the cache with respect to each tile 12.

Figure 2:
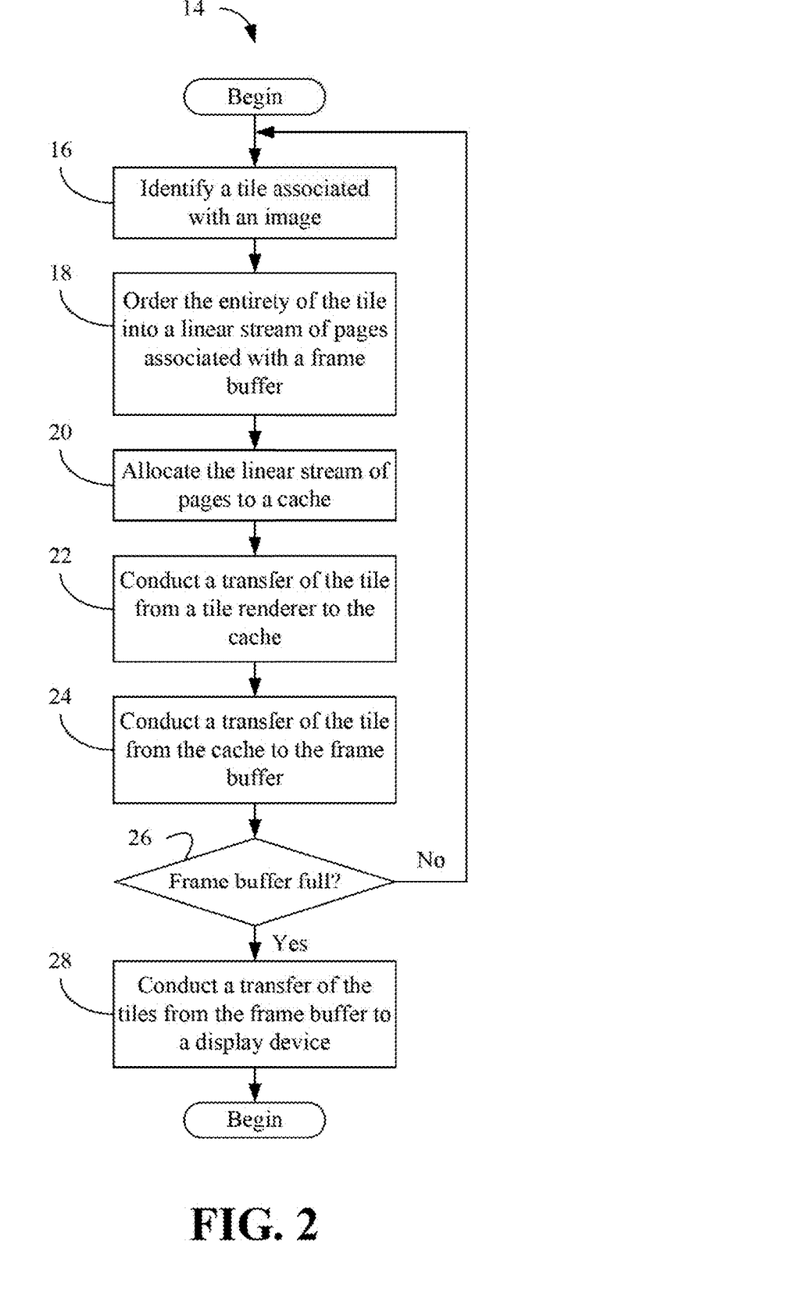
FIG. 2 is a flowchart of an example of a method of processing image data according to an embodiment.

Turning now to FIG. 2, a method 14 of processing image data is shown. The method 14 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 14 may be written in any combination of one or more programming languages, including an object oriented programming language such as Java, Smalltalk, C++ or the like and conventional procedural programming languages, such as the "C" programming language or similar programming languages.

Illustrated processing block 16 provides for identifying a tile associated with an image, wherein an entirety of the tile may be ordered at block 18 into a linear stream of pages associated with a frame buffer such as, for example, the frame buffer 10 (FIG. 1). Block 20 may allocate the linear stream of pages to a cache. In one example, the linear stream of pages is allocated to the cache in accordance with a fixed set selection policy of the cache. For example, a least significant bit (LSB) of the address of each page in the frame buffer might be used to select a set of cache lines to store the page in question. Allocating the pages in accordance with the fixed set selection policy may obviate any concerns over inefficiencies that might result with respect to other non-tiled types of data. Thus, such an approach may be particularly advantageous for caches such as, for example, last level caches (LLCs), which may support both tiled and non-tiled data.

A transfer (e.g., first transfer) of the tile may be conducted at block 22 from a tile renderer (e.g., hardware/HW tile renderer) to the cache, wherein the transfer at block 22 may result in full utilization of the cache. In this regard, because all pages in the tile may be sequentially allocated, the LSBs of the page addresses may toggle across the entire tile and the set selection in the cache may in turn be uniformly distributed across the entire cache. Another transfer (e.g., second transfer) of the tile may be conducted at block 24 from the cache to the frame buffer. Illustrated block 26 determines whether the frame buffer is full. If not, another tile may be identified and the illustrated ordering, allocation and tile transfers may be repeated for the remaining tiles in the image. Otherwise, illustrated block 28 conducts a transfer of the tiles from the frame buffer to a display device.

Figure 3:
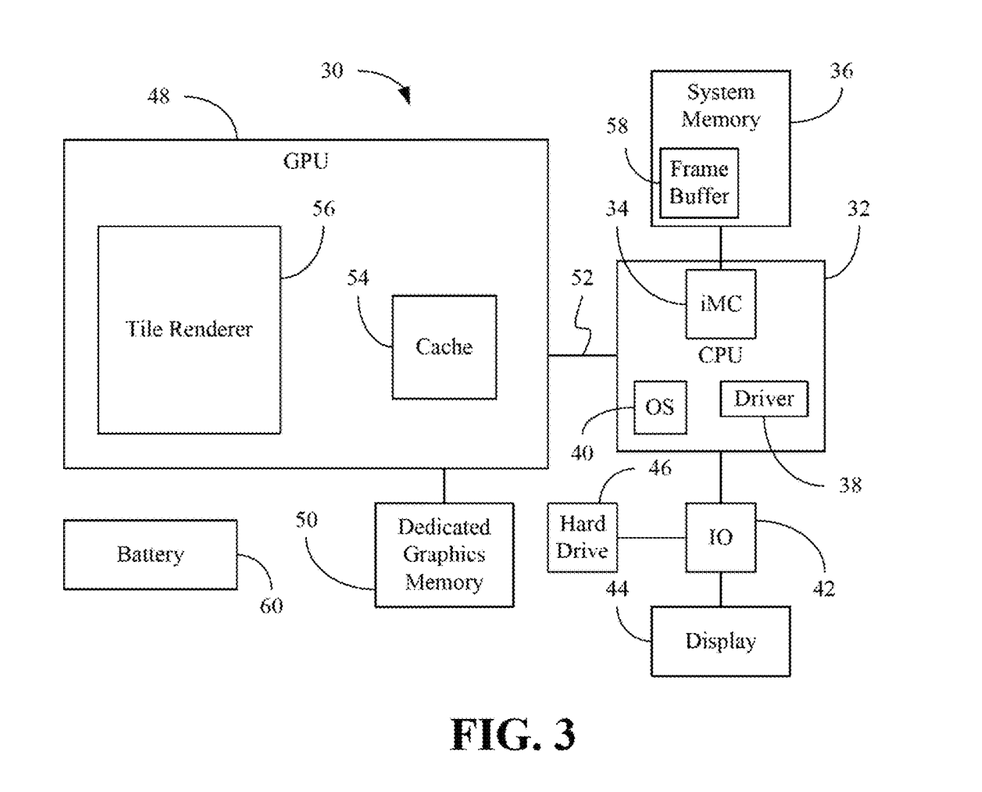
FIG. 3 is a block diagram of an example of a system according to an embodiment.

Turning now to FIG. 3, a computing system 30 is shown, wherein the system 30 may be part of a mobile platform such as a laptop, mobile Internet device (MID), personal digital assistant (PDA), media player, imaging device, etc., any smart device such as a smart phone, smart tablet, smart TV (television) and so forth, or any combination thereof. The system 30 may also be part of a fixed platform such as a personal computer (PC), server, workstation, etc. The illustrated system 30 includes a battery 60 to supply power to the system 30 and a central processing unit (CPU, e.g., main/host processor) 32 with an integrated memory controller (iMC) 34 that provides access to system memory 36. The system memory 36 could include, for example, double data rate (DDR) synchronous dynamic random access memory (SDRAM, e.g., DDR3 SDRAM JEDEC Standard JESD79-3C, April 2008) modules, which may be incorporated, for example, into a single inline memory module (SIMM), dual inline memory module (DIMM), small outline DIMM (SODIMM), and so on. The system memory 36 may also be configured to include a frame buffer 58 such as, for example, the frame buffer 10 (FIG. 1), already discussed.

The CPU 32 may also have one or more drivers 38 and/or processor cores (not shown), where each core may be fully functional with instruction fetch units, instruction decoders, level one (L1) cache, execution units, and so on. The CPU 32 could alternatively communicate with an off-chip variation of the iMC 34, also known as a Northbridge, via a front side bus or a point-to-point fabric that interconnects each of the components in the system 30. The CPU 32 may also execute an operating system (OS) 40.

The illustrated CPU 32 communicates with an input/output (IO) module 42, also known as a Southbridge, via a bus. The iMC 34/CPU 32 and the IO module 42 are sometimes referred to as a chipset. The CPU 32 may also be operatively connected to a network via a network port (not shown) through the IO module 42 and various other controllers (not shown). The IO module 42 may also communicate with a display 44 to provide for the visual output of video, images, and so forth. The IO module 66 may also provide support for user interface devices (not shown) such as a keypad, mouse, etc., in order to allow a user to interact with and perceive information from the system 30.

The IO module 42 may also have internal controllers such as USB (Universal Serial Bus, e.g., USB Specification 2.0, USB Implementers Forum), Serial ATA (SATA, e.g., SATA Rev. 3.0 Specification, May 27, 2009, SATA International Organization/SATA-IO), High Definition Audio, and other controllers. The illustrated IO module 42 is also coupled to storage, which may include a hard drive 46, read only memory (ROM), optical disk, flash memory (not shown), etc.

The illustrated system 30 also includes a dedicated graphics processing unit (GPU) 48 coupled to a dedicated graphics memory 50. The dedicated graphics memory 50 could include, for example, GDDR (graphics DDR) or DDR SDRAM modules, or any other memory technology suitable for supporting graphics rendering. The GPU 48 and graphics memory 50 might be installed on a graphics/video card, wherein the GPU 48 may communicate with the CPU 32 via a graphics bus 52 such as a PCI Express Graphics (PEG, e.g., Peripheral Components Interconnect/PCI Express x16 Graphics 150W-ATX Specification 1.0, PCI Special Interest Group) bus, or Accelerated Graphics Port (e.g., AGP V3.0 Interface Specification, September 2002) bus. The graphics card may be integrated onto the system motherboard, into the main CPU 32 die, configured as a discrete card on the motherboard, etc.

The GPU 48 may include an internal cache 54 to store instructions and other data. In one example, the cache 54 is a last level cache (LLC) that is large enough to store a complete tile associated with an image. The illustrated GPU 48 also includes a hardware tile renderer 56 that generates tiles containing color values for images on a pixel-by-pixel basis. The OS 40 and/or driver 38 may generally be configured to process image data as described with regard to the method 14 (FIG. 2), already discussed. Thus, the OS 40 and/or driver 38 may be configured to identify tiles associated with an image and order an entirety of each tile into a linear stream of pages associated with the frame buffer 58. Additionally, the OS 40 and/or driver 38 may allocate the linear stream of pages to the cache 54. In one example, the linear stream of pages is allocated to the cache 54 in accordance with a fixed set selection policy of the cache 54.

Figure 4:
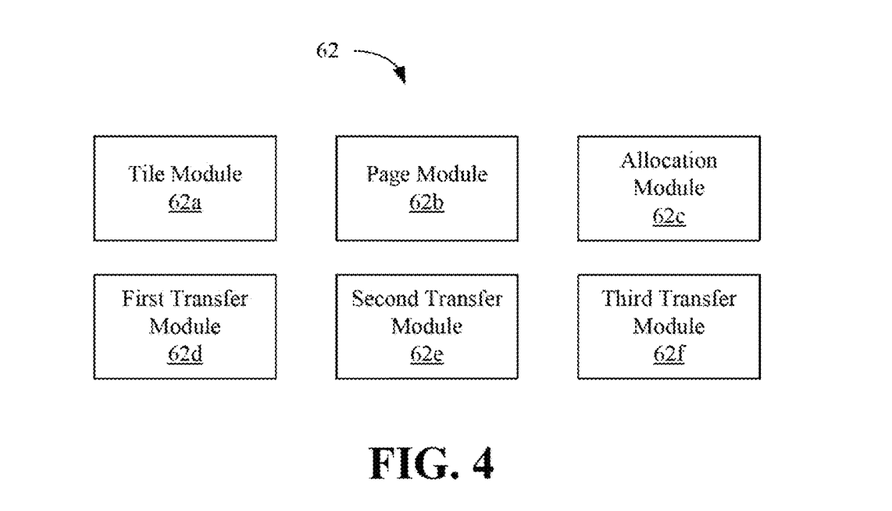
FIG. 4 is a block diagram of an example of a logic architecture according to an embodiment.

Turning now to FIG. 4, a logic architecture 62 (62a-62f) is shown. The illustrated architecture 62 may generally be used to process image data as described with regard to the method 14 (FIG. 2) and/or the system 30 (FIG. 3), already discussed. Thus, a tile module 62a may identify a tile associated with an image and a page module 62b may order an entirety of the tile into a linear stream of pages associated with a frame buffer. The illustrated architecture 62 also includes an allocation module 62c that allocates the linear stream of pages to a cache. The linear stream of pages may be allocated to the cache in accordance with a fixed set selection policy of the cache.

A first transfer module 62d may conduct a first transfer of the tile from a tile renderer to the cache, wherein the first transfer of the tile may result in full utilization of the cache. Additionally, a second transfer module 62e may conduct a second transfer of the tile from the cache to the frame buffer. The first transfer module 62d may repeat the first transfer for a plurality of tiles associated with the image and the second transfer module 62e may repeat the second transfer for the plurality of tiles. In this regard, the illustrated architecture 62 also includes a third transfer module 62d to conduct a third transfer of the plurality of tiles from the frame buffer to a display.

Figure 5:
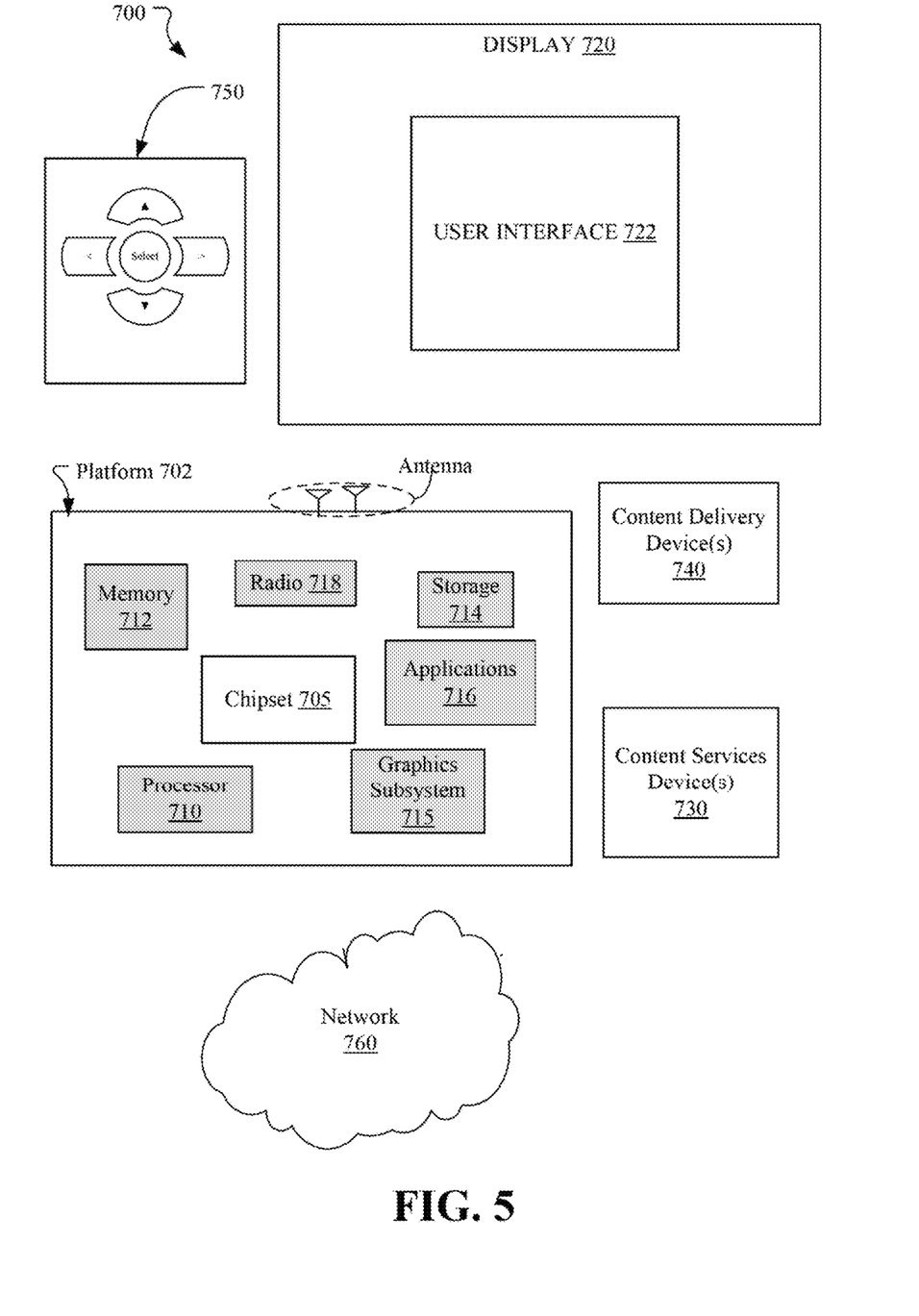
FIG. 5 is a block diagram of an example of a system having a navigation controller according to an embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to process image data (e.g., video bitstream content) as described herein.

In embodiments, the system 700 comprises a platform 702 coupled to a display 720. Platform 702 may receive video bitstream content from a content device such as content services device(s) 730 or content delivery device(s) 740 or other similar content sources. A navigation controller 750 comprising one or More navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance and provide enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the GPU 48 (FIG. 3), already discussed. In addition, the processor 710 may be configured to operate as the CPU 32 (FIG. 3), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content Examples of content providers may include any cable or satellite television or radio or Internet content providers. The provided examples are not meant to limit embodiments.

In embodiments, platform 702 may receive control signals from navigation. controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the embodiments.

In various embodiments, system 700 may be implemented as a wireless system, a wired system, or a combination of both. When implemented as a wireless system, system. 700 may include components and interfaces suitable for communicating over a wireless shared media, such as one or more antennas, transmitters, receivers. transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
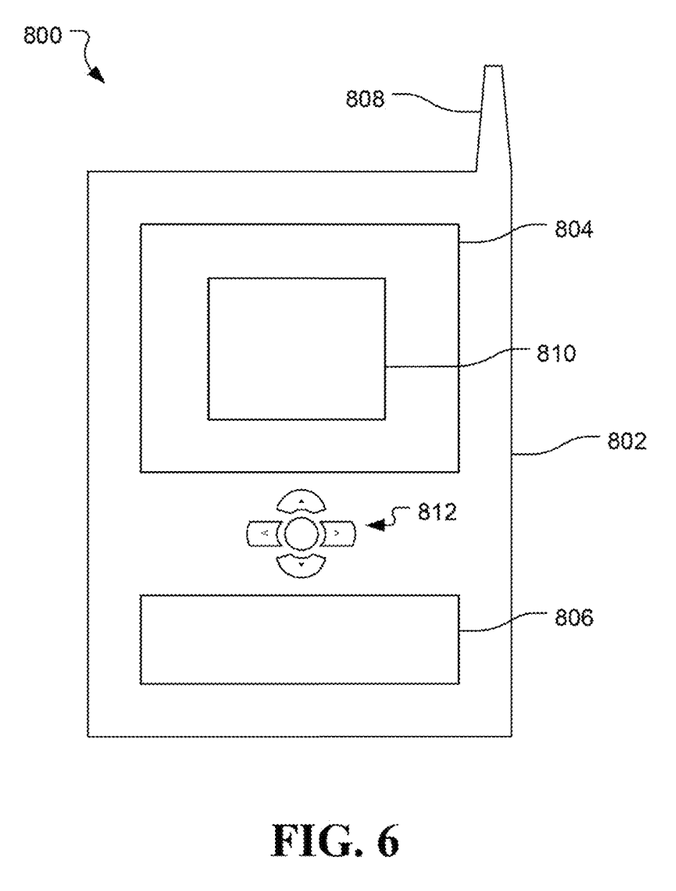
FIG. 6 is a block diagram of an example of a system having a small form factor according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Additional Notes and Examples

Example 1 may include a system comprising a battery to supply power to the system, a frame buffer, a cache, a host processor and at least one computer readable storage medium including a set of instructions. If executed by the host processor, the instructions may cause the system to identify a tile associated with an image, order an entirety of the tile into a linear stream of pages associated with the frame buffer and allocate the linear stream of pages to the cache.

Example 2 may include the system of Example 1, wherein the linear stream of pages is to be allocated to the cache in accordance with a fixed set selection policy of the to cache.

Example 3 may include the system of Example 1, further including a tile renderer, wherein the instructions, if executed, cause the system to conduct a first transfer of the tile from the tile renderer to the cache, and conduct a second transfer of the tile from the cache to the frame buffer.

Example 4 may include the system of Example 3, wherein the first transfer is to result in full utilization of the cache.

Example 5 may include the system of Example 3, wherein the first transfer module is to repeat the first transfer for a plurality of tiles associated with the image and the second transfer module is to repeat the second transfer for the plurality of tiles, the system further including a third transfer module to conduct a third transfer of the plurality of tiles from the frame buffer to a display.

Example 6 may include the system of any one of Examples 1 to 5, wherein the tile is to include a plurality of color values for the image on a pixel-by-pixel basis.

Example 7 may include an apparatus to process image data, comprising a tile module to identify a tile associated with an image, a page module to order an entirety of the tile into a linear stream of pages associated with a frame buffer and an allocation module to allocate the linear stream of pages to a cache.

Example 8 may include the apparatus of Example 7, wherein the linear stream of pages is to be allocated to the cache in accordance with a fixed set selection policy of the cache.

Example 9 may include the apparatus of Example 7, further including a first transfer module to conduct a first transfer of the tile from a tile renderer to the cache, and a second transfer module to conduct a second transfer of the tile from the cache to the frame buffer.

Example 10 may include the apparatus of Example 9, wherein the first transfer is to result in full utilization of the cache.

Example 11 may include the apparatus of Example 9, wherein the first transfer module is to repeat the first transfer for a plurality of tiles associated with the image and the second transfer module is to repeat the second transfer for the plurality of tiles, the apparatus further including a third transfer module to conduct a third transfer of the plurality of tiles from the frame buffer to a display.

Example 12 may include the apparatus of any one of Examples 7 to 11, wherein the tile is to include a plurality of color values for the image on a pixel-by-pixel basis.

Example 13 may include a method of processing image data, comprising identifying a tile associated with an image, ordering an entirety of the tile into a linear stream of pages associated with a frame buffer and allocating the linear stream of pages to a cache.

Example 14 may include the method of Example 13, wherein the linear stream of pages is allocated to the cache in accordance with a fixed set selection policy of the cache.

Example 15 may include the method of Example 13, further including conducting a first transfer of the tile from a tile renderer to the cache, and conducting a second transfer of the tile from the cache to the frame buffer.

Example 16 may include the method of Example 15, wherein the first transfer results in full utilization of the cache.

Example 17 may include the method of Example 15, further including repeating the first transfer and the second transfer for a plurality of tiles associated with the image, and conducting a third transfer of the plurality of tiles from the frame buffer to a display.

Example 18 may include the method of any one of Examples 13 to 17, wherein the tile includes a plurality of color values for the image on a pixel-by-pixel basis.

Example 19 may include at least one computer readable storage medium comprising a set of instructions which, if executed by a computing device, cause the computing device to identify a tile associated with an image, order an entirety of the tile into a linear stream of pages associated with a frame buffer and allocate the linear stream of pages to a cache.

Example 20 may include the at least one computer readable storage medium Example 19, wherein the linear stream of pages is to be allocated to the cache in accordance with a fixed set selection policy of the cache.

Example 21 may include the at least one computer readable storage medium of Example 19, wherein the instructions, if executed, cause a computing device to conduct a first transfer of the tile from a tile renderer to the cache, and conduct a second transfer of the tile from the cache to the frame buffer.

Example 22 may include the at least one computer readable storage medium of Example 21, wherein the first transfer is to result in full utilization of the cache.

Example 23 may include the at least one computer readable storage medium of Example 21, wherein the instructions, if executed, cause a computing device to repeat the first transfer and the second transfer for a plurality of tiles associated with the image, and conduct a third transfer of the plurality of tiles from the frame buffer to a display.

Example 24 may include the at least one computer readable storage medium of any one of Examples 19 to 23, wherein the tile is to include a plurality of color values for the image on a pixel-by-pixel basis.

Example 25 may include an apparatus to process image data, comprising means for performing the method of any one of Examples 13 to 18.

Thus, techniques described herein may provide a page management approach that fully utilizes hardware caches for tiled rendering. In addition, a fixed set selection policy may be used without creating concern over tiled and non-tiled data being written to the same cache. Moreover, the techniques may obviate any need for tuning the cache policy to be data type dependent or randomizing frame buffer page assignments. Indeed, tile size and cache size determinations may be significantly simplified, which may in turn be particularly advantageous in small form factor devices having limited cache space.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
   a battery to supply power to the system;
   a frame buffer to include one or more tiles associated with an image, each of the one or more tiles including a plurality of pages;
   a cache;
   a host processor; and
   at least one computer readable storage medium including a set of instructions which, if executed by the host processor, cause the system to:
      identify the one or more tiles associated with the image;
      order a linear stream of pages associated with the frame buffer into an entirety of each of the one or more tiles; and
      allocate the linear stream of pages to the cache,
   wherein each of the pages is an addressable page included in the one or more tiles.

2. The system of claim 1, wherein the linear stream of pages is to be allocated to the cache in accordance with a fixed set selection policy of the cache.

3. The system of claim 1, further including a tile renderer, wherein the instructions, if executed, cause the system to:
   conduct a first transfer of the one or more tiles from the tile renderer to the cache; and
   conduct a second transfer of the one or more tiles from the cache to the frame buffer.

4. The system of claim 3, wherein the first transfer is to result in full utilization of the cache.

5. The system of claim 3, wherein a first transfer module is to repeat the first transfer for a plurality of tiles associated with the image and a second transfer module is to repeat the second transfer for the plurality of tiles, the system further including a third transfer module to conduct a third transfer of the plurality of tiles from the frame buffer to a display.

6. The system of claim 1, wherein the one or more tiles is to include a plurality of color values for the image on a pixel-by-pixel basis.

7. An apparatus comprising:
   a frame buffer to include one or more tiles associated with an image, each of the one or more tiles including a plurality of pages;
   a processor configured to execute:
      a tile module to identify the one or more tiles associated with the image;
      a page module to order a linear stream of pages associated with the frame buffer into an entirety of each of the one or more tiles; and
      an allocation module to allocate the linear stream of pages to a cache,
   wherein each of the pages is an addressable page included in the one or more tiles.

8. The apparatus of claim 7, wherein the linear stream of pages is to be allocated to the cache in accordance with a fixed set selection policy of the cache.

9. The apparatus of claim 7, further including:
   a first transfer module to conduct a first transfer of the one or more tiles from a tile renderer to the cache; and
   a second transfer module to conduct a second transfer of the one or more tiles from the cache to the frame buffer.

10. The apparatus of claim 9, wherein the first transfer is to result in full utilization of the cache.

11. The apparatus of claim 9, wherein the first transfer module is to repeat the first transfer for a plurality of tiles associated with the image and the second transfer module is to repeat the second transfer for the plurality of tiles, the apparatus further including a third transfer module to conduct a third transfer of the plurality of tiles from the frame buffer to a display.

12. The apparatus of claim 7, wherein the one or more tiles is to include a plurality of color values for the image on a pixel-by-pixel basis.

13. A method comprising:
   identifying one or more tiles associated with an image, each of the one or more tiles including a plurality of pages;
   ordering a linear stream of pages associated with a frame buffer into an entirety of each of the one or more tiles; and
   allocating the linear stream of pages to a cache,
   wherein each of the pages is an addressable page included in the one or more tiles.

14. The method of claim 13, wherein the linear stream of pages is allocated to the cache in accordance with a fixed set selection policy of the cache.

15. The method of claim 13, further including:
   conducting a first transfer of the one or more tiles from a tile renderer to the cache; and
   conducting a second transfer of the one or more tiles from the cache to the frame buffer.

16. The method of claim 15, wherein the first transfer results in full utilization of the cache.

17. The method of claim 15, further including:
   repeating the first transfer and the second transfer for a plurality of tiles associated with the image; and
   conducting a third transfer of the plurality of tiles from the frame buffer to a display.

18. The method of claim 15, wherein the one or more tiles include a plurality of color values for the image on a pixel-by-pixel basis.

19. At least one non-transitory computer readable storage medium comprising a set of instructions which, if executed by a computing device, cause the computing device to:
   identify one or more tiles associated with an image, each of the one or more tiles including a plurality of pages;
   order a linear stream of pages associated with a frame buffer into an entirety of each of the one or more tiles; and
   allocate the linear stream of pages to a cache,
   wherein each of the pages is an addressable page included in the one or more tiles.

20. The at least one computer readable storage medium of claim 19, wherein the linear stream of pages is to be allocated to the cache in accordance with a fixed set selection policy of the cache.

21. The at least one computer readable storage medium of claim 19, wherein the instructions, if executed, cause a computing device to:
- conduct a first transfer of the one or more tiles from a tile renderer to the cache; and
- conduct a second transfer of the one or more tiles from the cache to the frame buffer.

22. The at least one computer readable storage medium of claim 21, wherein the first transfer is to result in full utilization of the cache.

23. The at least one computer readable storage medium of claim 21, wherein the instructions, if executed, cause a computing device to:
- repeat the first transfer and the second transfer for a plurality of tiles associated with the image; and
- conduct a third transfer of the plurality of tiles from the frame buffer to a display.

24. The at least one computer readable storage medium of claim 19, wherein the one or more tiles is to include a plurality of color values for the image on a pixel-by-pixel basis.

* * * * *